United States Patent [19]

Grassens et al.

[11] Patent Number: 4,683,520
[45] Date of Patent: Jul. 28, 1987

[54] MECHANICAL SHOCK MOUNT SYSTEM FOR ELECTRICAL APPARATUS

[75] Inventors: Leonardus J. Grassens; Peter J. Janssen, both of Colorado Springs, Colo.

[73] Assignee: Laser Magnetic Storage International Company, Colorado Springs, Colo.

[21] Appl. No.: 885,351

[22] Filed: Jul. 14, 1986

[51] Int. Cl.⁴ .......................... H02B 1/02; H05K 7/02
[52] U.S. Cl. .................................... 361/427; 361/376; 361/417; 361/419; 361/429; 248/564; 248/612; 248/618; 248/629; 248/635; 211/26
[58] Field of Search ........ 361/427, 429, 376, 417–420; 248/564, 567, 589, 590, 542, 612, 618, 625, 629, 635; 211/26

[56] References Cited

U.S. PATENT DOCUMENTS

| 1,876,640 | 9/1932 | Dobson | 248/635 |
| 1,921,028 | 8/1933 | Glascock | 248/618 |
| 2,289,514 | 7/1942 | Mastney et al. | 361/417 |
| 2,751,147 | 6/1956 | Wurtz | 248/629 |
| 3,066,367 | 12/1962 | Garman | 361/427 |
| 3,822,050 | 7/1974 | Schurr | 361/427 |

Primary Examiner—Robert S. Macon
Attorney, Agent, or Firm—Sheridan, Ross & McIntosh

[57] ABSTRACT

A shock mount for mounting an electrical apparatus to a chassis includes a resilient buffer mounted to the apparatus and to the end of an L-shaped arm. The L-shaped arm is joined to and integral with the chassis and is arranged to support bending and torsional loads to absorb mechanical shock.

4 Claims, 7 Drawing Figures

MECHANICAL SHOCK MOUNT SYSTEM FOR ELECTRICAL APPARATUS

This invention relates to shock mounts for an electronic apparatus, and particularly to mounts for relieving mechanical shock to an electronic apparatus such an optical disk drive.

It is common to mount electrical apparatus on resilient feet or grommets to provide mechanical shock isolation from a rigidly mounted chassis. Particularly, when transporting sensitive electrical apparatus or when such apparatus is utilized on moving vehicles, mechanical shock from the movement or transportation can impart damaging mechanical shock waves and vibration to the electrical apparatus. Likewise, moving components of the apparatus may themselves establish mechanical shock waves and vibration to the apparatus which, unless dampened, can reverberate with the chassis to cause damage to the electrical apparatus.

It is common to provide resilient feet or grommets to mount electrical apparatus to provide dampening to relieve mechanical shock. Also, it is common to suspend such feet or grommets on arms of the chassis. However, such dampening techniques have provided shock isolation in one direction only, namely the direction of compression of the resilient foot or grommet or the direction of bending of the suspension arm.

It is an object of the present invention to provide a more reliable mechanical shock mounting system for electrical apparatus to permit the shock mount system to be "tuned" to the requirements of the application.

It is another object of the present invention to provide a shock mounting system employing bending and torsion, as well as compression, as contributing factors to dampening external forces.

In accordance with the present invention, a resilient buffer, such as a foot or grommet, is secured to the end of an L-shaped arm extending from the chassis. The buffer is secured to the electrical apparatus being isolated. The L-shaped arm provides a combination of bending and torsion depending upon the direction of the load forces on the electrical apparatus.

One feature of the present invention resides in the provision of a mounting tab at the end of the L-shaped arm for mounting the resilient or grommet, the tab providing additional bending for supporting compression forces on the buffer.

Another feature of the invention resides in the fact that the resilient grommet or foot is secured to both the arm and apparatus to transfer radial and tangential loads to the arm.

The above and other features of this invention will be more fully understood from the following detailed description, and the accompanying drawings, in which.

Figure 1:
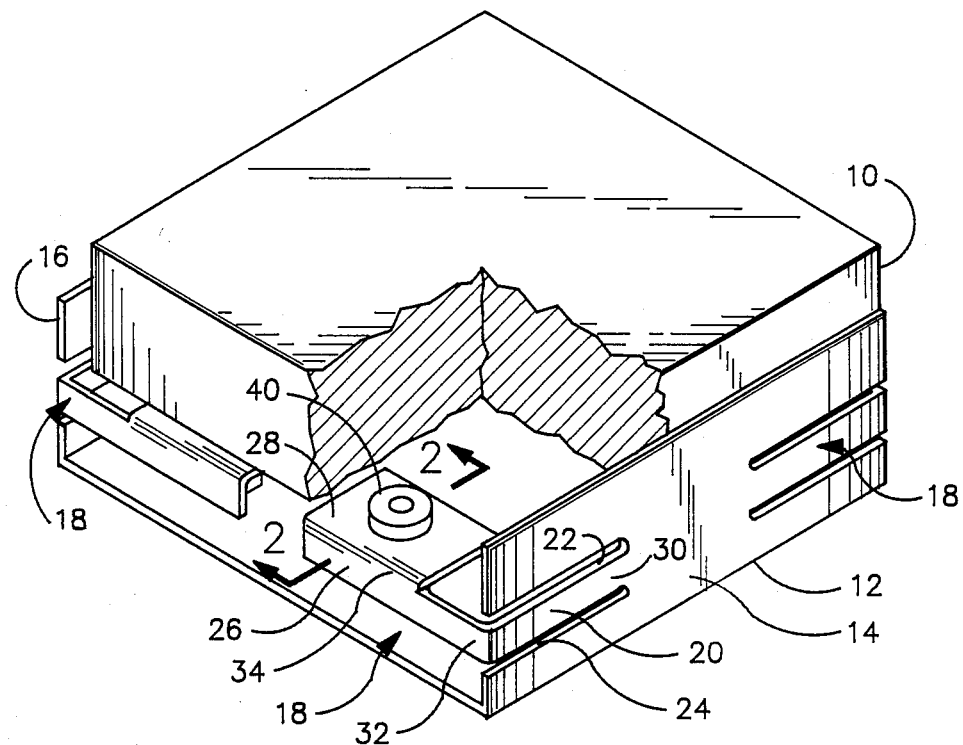
FIG. 1 is a perspective view, partly in cutaway cross-section, of an electrical apparatus mounted in a chassis having a shock mount in accordance with the presently preferred embodiment of the present invention.
Figure 2:
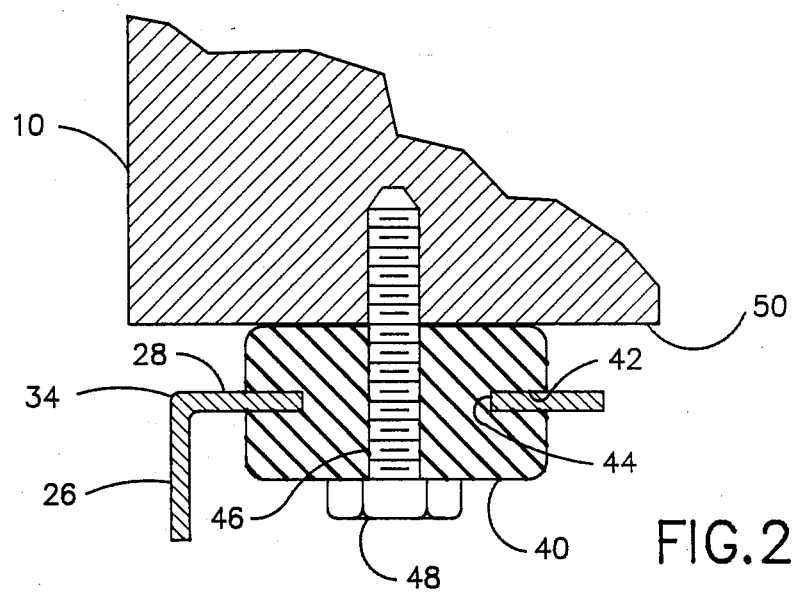
FIG. 2 is a section view taken at line 2—2 in FIG. 1.

Referring to the drawings, and particularly the FIGS. 1 and 2, there is illustrated an electrical apparatus 10 mounted in a chassis 12 having opposite sidewalls 14 and 16. As an example, apparatus 10 may be a sensitive electrical apparatus, such as an optical disk drive, and chassis 12 may be constructed of rigid material such as hard plastic or metal. Integral with each sidewall are a pair of shock mounts, illustrated generally at 18, a typical employment using four such mounts. Each shock mount has a first arm 20 formed by slots 22 and 24, a second arm 26 orthogonal to arm 20, and a mounting tab 28 orthogonal to both arms 20 and 26. Arms 20 and 26 generally form an L-shaped mounting arm, integral to chassis 12 at 30, defined by the terminus of slots 22 and 24. If the chassis is constructed of metal. The shock mount is conveniently formed by bending at 32 to form the separate arms 20 and 26 and by bending at 34 to form the tab 28.

Resilient grommet 40 is mounted to tab 28. Conveniently, grommet 40 may include a peripheral slot 42 arranged so that the grommet may be received in aperture 44 of tab 28 and securely held by the tab itself. Aperture 46 in grommet 40 permits the shank of threaded fastener 48 to be threadably assembled to electronic assembly 10 so as to hold the grommet 40 in compression between surface 50 of the electrical apparatus and the head of threaded fastener 48.

Figure 3:
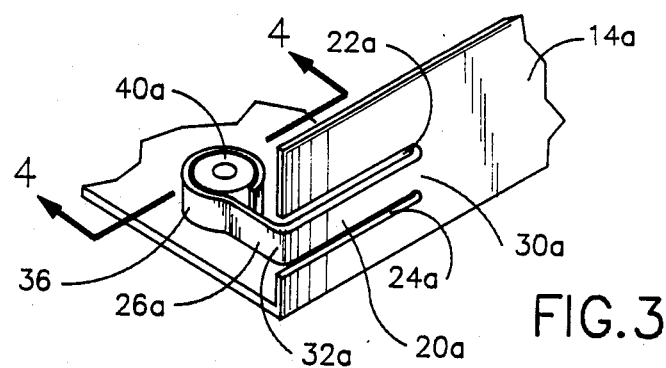
FIG. 3 is a perspective view, as in FIG. 1, of a portion of a chassis embodying a shock mount in accordance with a modification of the present invention.
Figure 4:
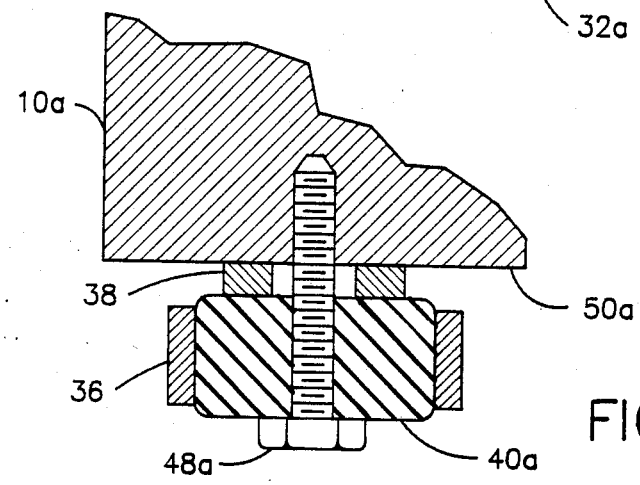
FIG. 4 is a section view taken at line 4—4 in FIG. 3.

FIGS. 3 and 4 illustrate a modification of the shock isolation system illustrated in FIGS. 1 and 2 wherein the L-shaped suspension arm is formed by arms 20a and 26a formed by slots 22a and 24a and bent at 32a as heretofore described in connection with FIGS. 1 and 2. In this case, however, the free end 36 of the arm is wrapped in a compression loop to hold resilient grommet 40a in peripheral compression. Threaded fastener 48a fastens through the grommet to hold the grommet in compression against electrical assembly 10a, as heretofore described. In the event the mounting surface 50a of the electrical apparatus is itself resilient or irregular, it may be desirable to employ a strengthening washer 38 between surface 50a and grommet 40a.

Figure 5A:
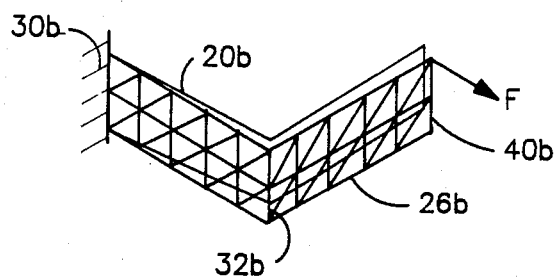
FIGS. 5A through 5C illustrate loading of a shock mount arm in accordance with the present invention.
Figures 5B, 5C:
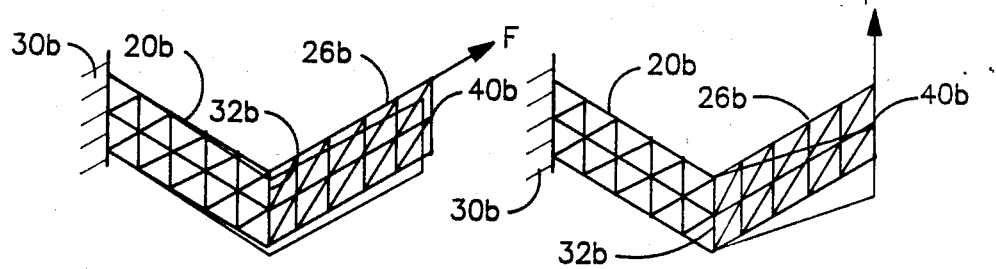

FIGS. 5A through 5C diagramatically illustrate the stress on the L-shaped arm 20 and 26 due to various loadings on the shock mount. Thus, FIG. 5A illustrates radial loads (parallel to arm 20 showing a slight bending of the arm from region 30b and a more pronounced bending of portion 26b. FIG. 5B illustrates targential loading parallel to arm 26 showing more pronounced bending of region 20b and less pronounced bending of region 26b. FIG. 5c illustrates focus or compressive loading normal to both arms 20 and 26 showing substantial torsional stress to both sections.

For design loads and operating frequencies, analysis may be made of the L-shaped arms 20 and 26 to fine "tune" the shock mount for optimal loading characteristics. Thus, adjustments in the length and width as well as thickness of the two arms of the L-shaped shock mount provides control of mechanical shock to virtually any design level. One feature of the present invention resides in the fact that the resilient buffer is secured to both the apparatus 10 and the arm 26 to insure radial and tangential loads are transferred to the shock mount.

This invention is not to be limited by the embodiments shown in the drawings and described in the description, which are given by way of example and not of limitation, but only in accordance with the scope of the appended claims.

What is claimed is:

1. A shock mount for mounting an electrical apparatus to a chassis comprising: a resilient buffer mounted to said apparatus for compressive shock absorption along a first line; and an L-shaped arm having a first arm portion and a second arm portion, said first arm portion extending along a second line normal to said first line, said first arm portion having support means supporting said resilient buffer at one end thereof, said second arm portion extending along a third line normal to said first and second lines, one end of said second arm portion being joined to the end of said first arm portion opposite the end supporting said resilient buffer and the other end of said second arm portion joined to and integral with said chassis, said L-shaped, are being so sized as to support bending and torsional loads to absorb mechanical shock.

2. Apparatus according to claim 1 wherein said support means comprises a tab portion formed at said one end of said first arm portion, said tab defining a plane normal to said first line, said buffer being sandwiched between said tab portion and said apparatus.

3. Apparatus according to claim 2 wherein said tab includes an aperture and said buffer is at least partially supported in said aperture.

4. Apparatus according to claim 1 wherein said support means comprises an extension of said arm compressively wrapped about at least a portion of the periphery of said buffer.

* * * * *

UNITED STATES PATENT AND TRADEMARK OFFICE
CERTIFICATE OF CORRECTION

PATENT NO. : 4,683,520
DATED : July 28, 1987
INVENTOR(S) : Grassens, et al.

It is certified that error appears in the above—identified patent and that said Letters Patent is hereby corrected as shown below:

At column 3, Claim 1, line 14, delete ", are" and substitute therefore --arm--

Signed and Sealed this

Fifteenth Day of December, 1987

Attest:

DONALD J. QUIGG

Attesting Officer

Commissioner of Patents and Trademarks